(12) United States Patent
Sadanaga et al.

(10) Patent No.: US 8,604,650 B2
(45) Date of Patent: Dec. 10, 2013

(54) MOTOR AND FAN MOTOR USING THE SAME MOTOR

(75) Inventors: Yuichiro Sadanaga, Osaka (JP); Masao Kojima, Osaka (JP); Yasushi Kamada, Kyoto (JP); Koji Kuyama, Hyogo (JP); Masahito Hidaka, Osaka (JP)

(73) Assignee: Panasonic Corporation (JP)

( * ) Notice: Subject to any disclaimer, the term of this patent is extended or adjusted under 35 U.S.C. 154(b) by 0 days.

(21) Appl. No.: 13/810,844

(22) PCT Filed: Mar. 13, 2012

(86) PCT No.: PCT/JP2012/001719
§ 371 (c)(1),
(2), (4) Date: Jan. 17, 2013

(87) PCT Pub. No.: WO2012/157159
PCT Pub. Date: Nov. 22, 2012

(65) Prior Publication Data
US 2013/0119828 A1    May 16, 2013

(30) Foreign Application Priority Data
May 16, 2011    (JP) ................. 2011-109038

(51) Int. Cl.
*H02K 5/24*    (2006.01)
*H02K 7/08*    (2006.01)

(52) U.S. Cl.
USPC .......... 310/51; 310/67 R; 310/90; 417/423.12

(58) Field of Classification Search
USPC ............................ 310/51, 90, 67 R
See application file for complete search history.

(56) References Cited

U.S. PATENT DOCUMENTS

| | | | | |
|---|---|---|---|---|
| 3,728,563 A | * | 4/1973 | Stone | 310/90 |
| 3,749,954 A | * | 7/1973 | Anderson, Jr. | 310/90 |
| 4,147,470 A | * | 4/1979 | Brooks et al. | 416/95 |
| 5,319,270 A | * | 6/1994 | Tanaka et al. | 310/67 R |
| 5,325,006 A | * | 6/1994 | Uno et al. | 310/90 |
| 6,339,275 B1 | * | 1/2002 | Katagiri | 310/424 |
| 7,365,940 B2 | * | 4/2008 | Yamamoto et al. | 360/99.08 |
| 7,760,464 B2 | * | 7/2010 | Xu et al. | 360/99.16 |
| 2008/0224554 A1 | * | 9/2008 | Hiwa et al. | 310/90 |
| 2009/0256295 A1 | | 10/2009 | Kodama | |
| 2010/0314958 A1 | * | 12/2010 | Hidaka et al. | 310/90 |

FOREIGN PATENT DOCUMENTS

| | | | | | |
|---|---|---|---|---|---|
| JP | 04-147470 A | * | 5/1992 | | H02K 29/08 |
| JP | 07-245902 A | | 9/1995 | | |
| JP | 2004-069024 A | | 3/2004 | | |
| JP | 2009-254193 A | | 10/2009 | | |

OTHER PUBLICATIONS

International Search Report for International Application No. PCT/JP2012/001719, dated Apr. 17, 2012, 1 page.

* cited by examiner

*Primary Examiner* — Burton Mullins
(74) *Attorney, Agent, or Firm* — Brinks Gilson & Lione (57) ABSTRACT

A motor includes a shaft, a bearing for supporting the shaft rotatably, a rotor including a rotor frame to be mounted to the shaft along an axial direction of the shaft, a stator confronting an outer wall of the rotor via a space, and a washer disposed between the bearing and the rotor frame. On top of that, a step section forming a recess is provided to the rotor frame at a place where the washer confronts the rotor frame.

6 Claims, 10 Drawing Sheets

MOTOR AND FAN MOTOR USING THE SAME MOTOR

This application is a 371 application of PCT/JP2012/001719 having an international filing date of Mar. 13, 2012, which claims priority to JP2011-109038 filed May 16, 2011, the entire contents of which are incorporated herein by reference.

TECHNICAL FIELD

The present invention relates to a structure of a motor, and a fan motor including the same motor.

BACKGROUND ART

A motor has been structured by various methods, and one of the conventional methods is this: A rotor and a stator are combined together such that a magnetic center of the rotor is away from a magnetic center of the stator by a given distance relative to an axial direction of a shaft. In this case, the rotor is supported by using the force to bring the magnetic center of the rotor in agreement with that of the stator along the axial direction. When a device including the foregoing motor is mounted to, e.g. a vehicle, a difference can be generated in a gravity-working direction acting on the motor depending on the mounted status of the device. If the difference is generated in the gravity-working direction, the motor structure discussed above allows no change in positional relation between the rotor and the stator along the axial direction, whereby a steady motor function is obtainable.

On the other hand, when the vehicle runs on a bad road, a strong shock is applied to the foregoing on-vehicle motor, then the rotor jumps and hits a bearing, thereby producing a collision sound. Techniques for overcoming this problem, i.e. lowering the collision sound, have been proposed, e.g. refer to Patent Literature 1. One of these techniques proposes that a round groove and a dumper ring are provided on the outer wall near the shaft end.

A conventional dumper ring should be mounted to the shaft properly, so that the motor structure becomes complicated, which requires complex assembling work and thus lowers an efficiency of the assembly. On top of that, use of the dumper ring increases the number of components.

Patent Literature: Unexamined Japanese Patent Application Publication No. 2009-254193

DISCLOSURE OF THE INVENTION

A motor of the present invention comprises the following structural elements:
- a shaft;
- a bearing supporting the shaft rotatably;
- a rotor including a rotor frame mounted to the shaft along an axial direction of the shaft;
- a stator confronting an outer wall of the rotor via a space;
- a washer disposed between the bearing and the rotor frame; and,
- a step section forming a recess and provided in the rotor frame at a place confronting the washer.

When the rotor frame jumps due to a strong shock, the structure discussed above allows the washer to buffer a collision between the rotor frame and the bearing. On top of that, the step section enhances a spring effect of the washer. As a result, a collision sound produced by the collision between the bearing and the rotor frame can be effectively lowered. The present invention provides the rotor frame with the step section, and also prepares the washer between the bearing and the rotor frame, whereby the collision sound can be lowered.

DETAILED DESCRIPTION OF THE PREFERRED EMBODIMENTS

Exemplary embodiments of the present invention are demonstrated hereinafter with reference to the accompanying drawings.

Embodiment 1

Figure 1:
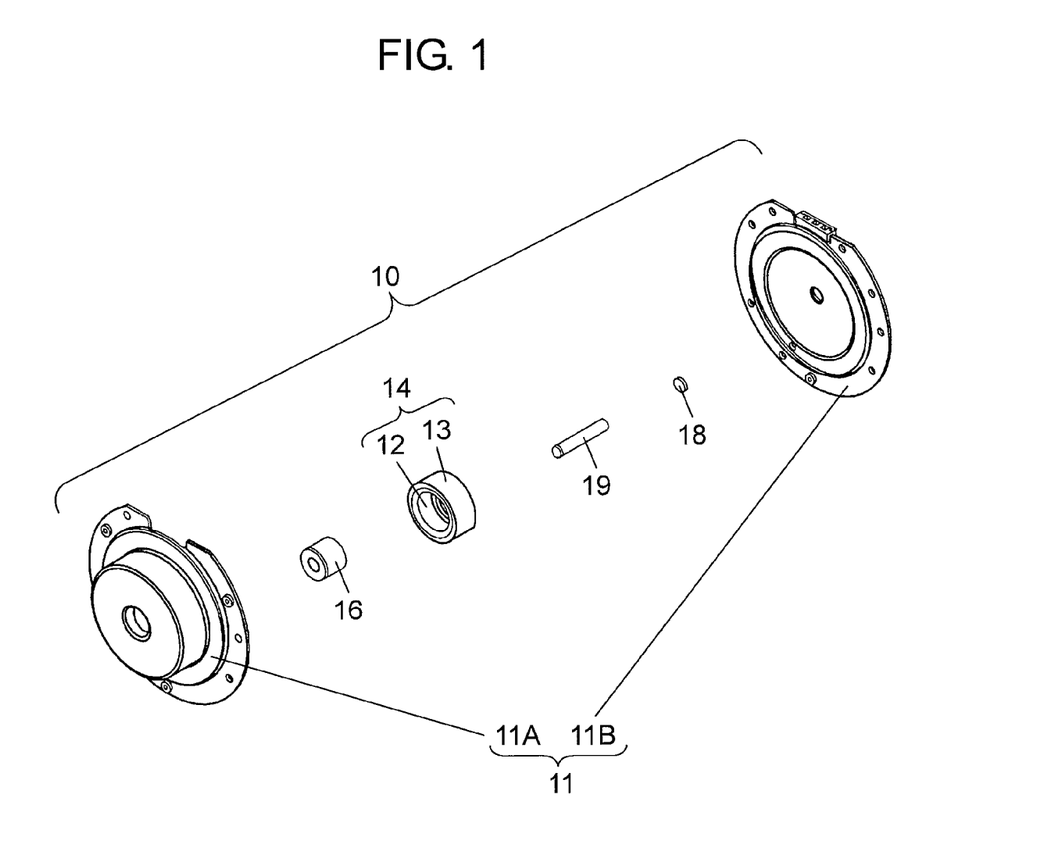
FIG. 1 shows a structure illustrating an outline of a motor in accordance with a first embodiment of the present invention.
Figure 2:
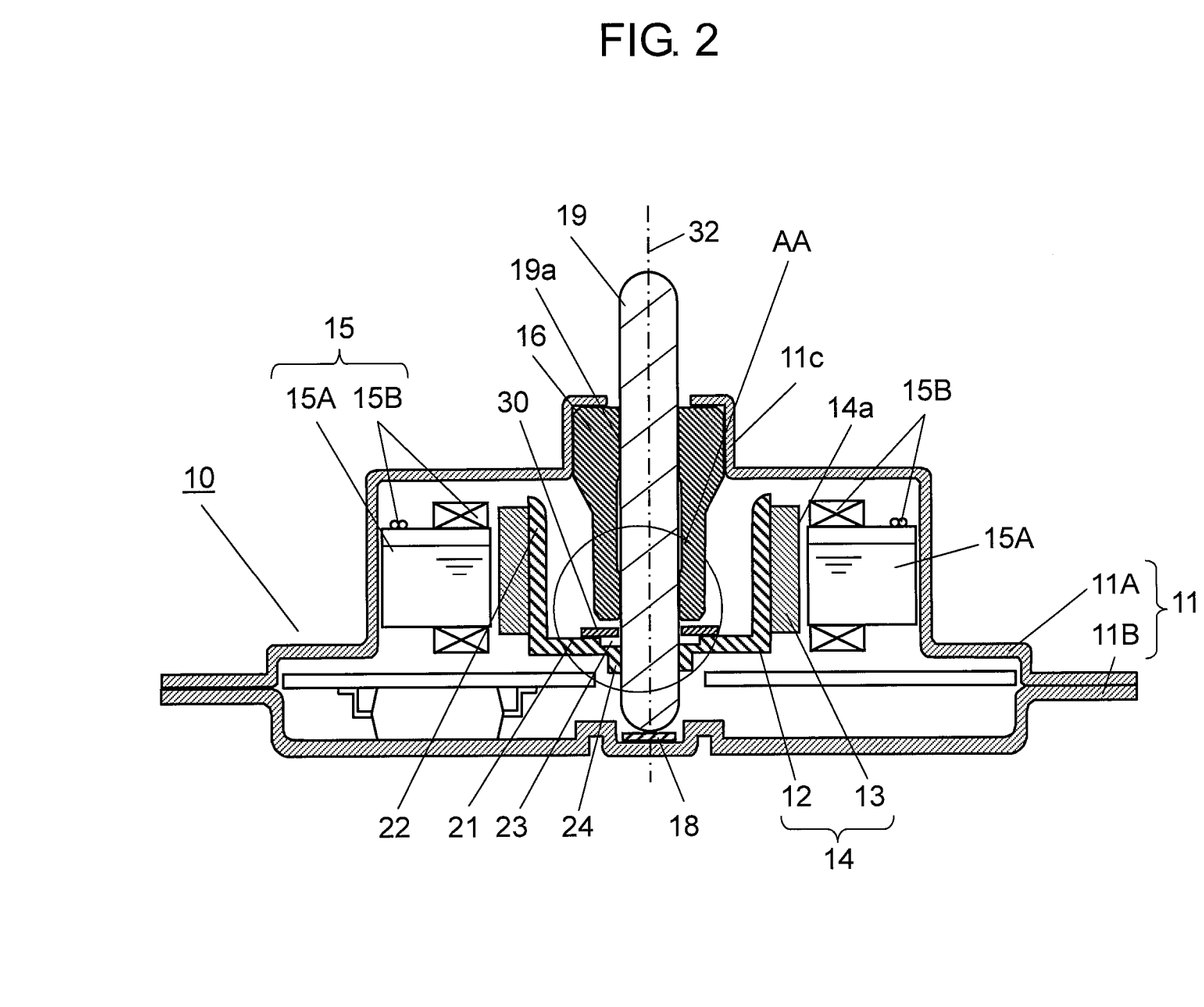
FIG. 2 is a sectional view of the motor shown in FIG. 1.

FIG. 1 shows a structure outlining motor 10 in accordance with the first embodiment of the present invention. FIG. 2 is a sectional view of motor 10 in accordance with the first embodiment. This embodiment employs an inner-rotor type brushless motor formed of a stator and a rotor placed inside the stator.

As shown in FIG. 1, motor 10 includes housing 11A, housing lid 11B, stator 15 disposed within housing 11A, shaft 19, bearing 16, rotor 14, and thrust plate 18. Housing 11A is closed with housing lid 11B, whereby motor housing 11 is formed.

Motor housing 11 is made of electro-galvanizing steel sheet. Shaft 19 is made of martensitic stainless steel, and is disposed at the inner center of motor housing 11. A first end of shaft 19 protrudes from housing 11A, and a second end thereof is supported by housing lid 11B via thrust plate 18. Bearing 16 belongs to plain bearing or metal bearing, for instance it is a oil impregnated sintered bearing and made of Fe—Cu—Sn—(C) material. Bearing 16 is mounted onto outer wall 19a of shaft 19 such that it goes along axial direction 32 of shaft 19. Shaft 19 is supported, via bearing 16, by a cylindrical section of housing 11A. The structure discussed above allows bearing 16 to support rotatably shaft 19.

Rotor 14 is mounted to shaft 19 along axial direction 32, and includes rotor frame 12 and rotor magnet 13. Rotor frame 12 is made of electro-galvanizing steel sheet and holds rotor magnet 13 bonded to rotor frame 12, thereby generating torque. Rotor magnet 13 is made of rare earth bonded magnet and is sensitive to a magnetic field generated by stator 15 that is discussed later.

As FIG. 2 shows, rotor frame 12 is formed of disc-like section 21, cylindrical section 22, step section 23, and mounting section 24. Rotor frame 12 is mounted to shaft 19 with the aid of mounting section 24. Disk-like section 21 extends from mounting section 24 to the outer periphery and forms an annular shape. Cylindrical section 22 extends from the outer periphery of disk-like section 21 along axial direction 32 and forms a cylindrical shape. Step section 23 is formed inside disk-like section 21. Rotor frame 12 is thus shaped like a cup of which first end is open. Motor 10 is structured such that bearing 16 is disposed on the open side of rotor frame 12 and a part of bearing 16 enters a hollow part of the cylindrical section inside rotor frame 12.

On top of that, motor 10 is provided with a space between rotor frame 12 and bearing 16 along axial direction 32 for washer 30 to be placed. Step section 23 is provided to rotor frame 12 at a place confronting washer 30.

Stator 15 confronts outer wall 14a of rotor 14 via a space. Stator 15 is formed of iron core 15A and winding 15B wound on iron core 15A. A given electric current runs through winding 15B, whereby an electromagnet can be formed, and the electromagnet generates a magnetic field, which is controlled such that rotor 14 can rotate with shaft 19 as a center at a desirable rpm.

Figure 3A:
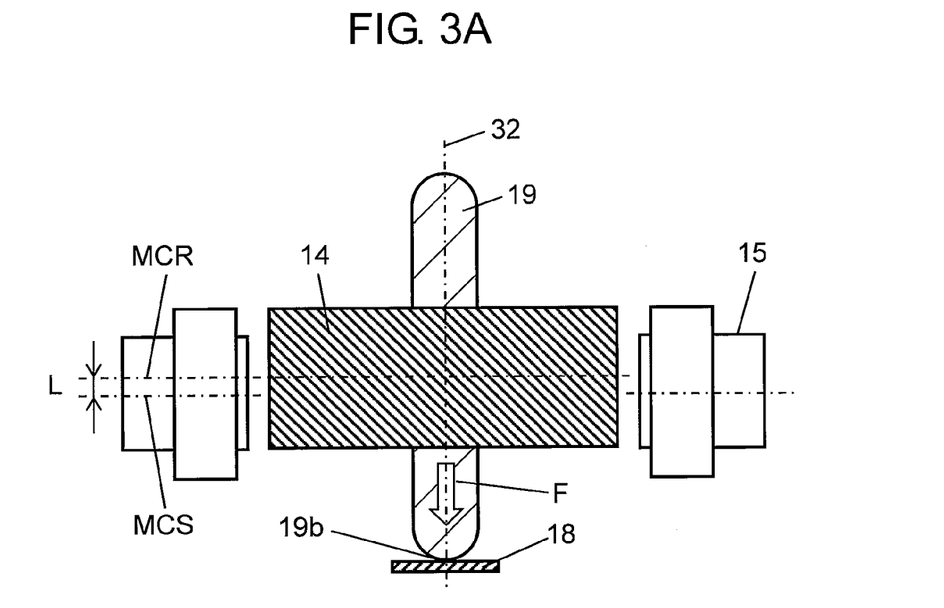
FIG. 3A illustrates a relation between a rotor and a stator of the motor shown in FIG. 1, and no shock is applied to the motor in this case.
Figure 3B:
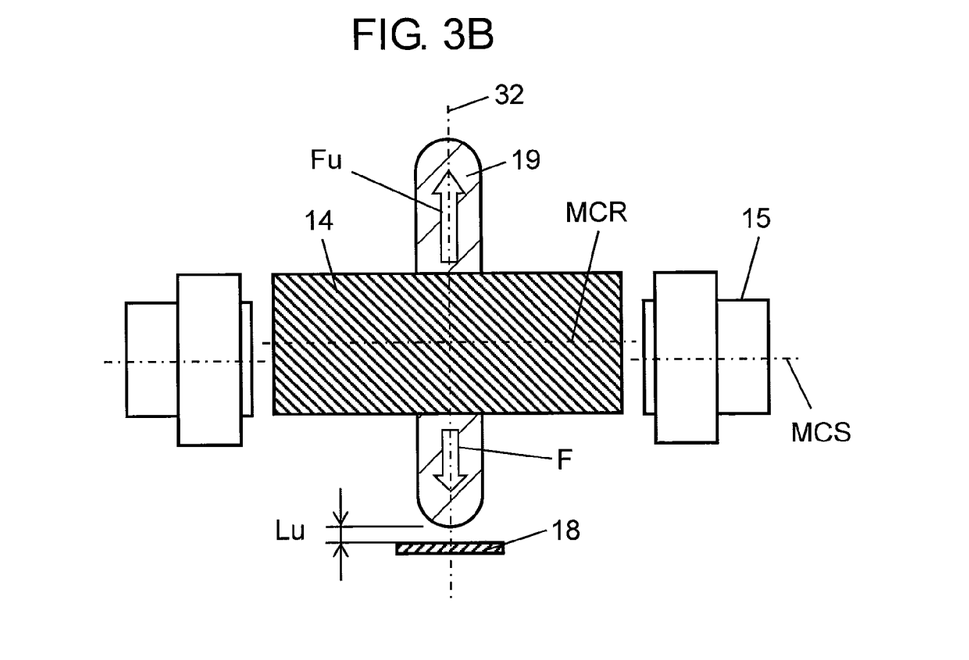
FIG. 3B a relation between a rotor and a stator of the motor shown in FIG. 1, and a shock is applied to the motor occurs in this case.

FIGS. 3A and 3B illustrate relations between rotor 14 and stator 15. This embodiment refers to a case where the force to bring the magnetic center of rotor 14 in agreement with that of stator 15, i.e. magnetic restoring force (hereinafter simply referred to as restoring force), is used for supporting rotor 14.

The restoring force to be used for motor 10 is described with reference to FIGS. 3A and 3B. FIG. 3A shows a case where no shock is applied to motor 10, and FIG. 3B shows a case where a shock is applied to motor 10.

First, as shown in FIG. 3A, rotor 14 and stator 15 are disposed such that magnetic center MCR of rotor 14 and magnetic center MCS of stator 15 are apart from each other by given distance L along axial direction 32. Rotor 14 and stator 15 have restoring force F along the direction canceling distance L. Restoring force F is indicated with an arrow in FIG. 3A. Thrust plate 18 is disposed along axial direction 32 of shaft 19 and a direction along which restoring force F is applied. Shaft 19 pushes thrust plate 18 with its end, i.e. pivot 19b, downward (the direction along which restoring force F is applied) as shown in FIG. 3A. In other words, thrust plate 18 supports shaft 19 at the end of shaft, i.e. pivot 19b. Thrust plate 18 is made of polyether ether ketone (PEEK) or ceramic, and needs sufficient abrasive resistance because it should support rotating shaft 19.

When a car is equipped with foregoing motor 10, and runs on a bad road or steps, the car receives shocks. In this case, force Fu greater than restoring force F is sometimes applied to shaft 19 along the opposite direction to restoring force F applied direction. Then rotor 14 jumps as shown in FIG. 3B. As discussed above, when motor 10 receives a strong shock, rotor 14 is vibrated along axial direction 32, so that rotor frame 12 hits bearing 16 and generates a collision sound, which is delivered to a driver and persons sharing the car, and gives unpleasant feeling to them.

A structure for lowering the collision sound is detailed hereinafter. In this embodiment, washer 30 is disposed between rotor frame 12 and bearing 16 in order to lower the collision sound, and step section 23 is formed in rotor frame 12 for the same purpose.

Figure 4:
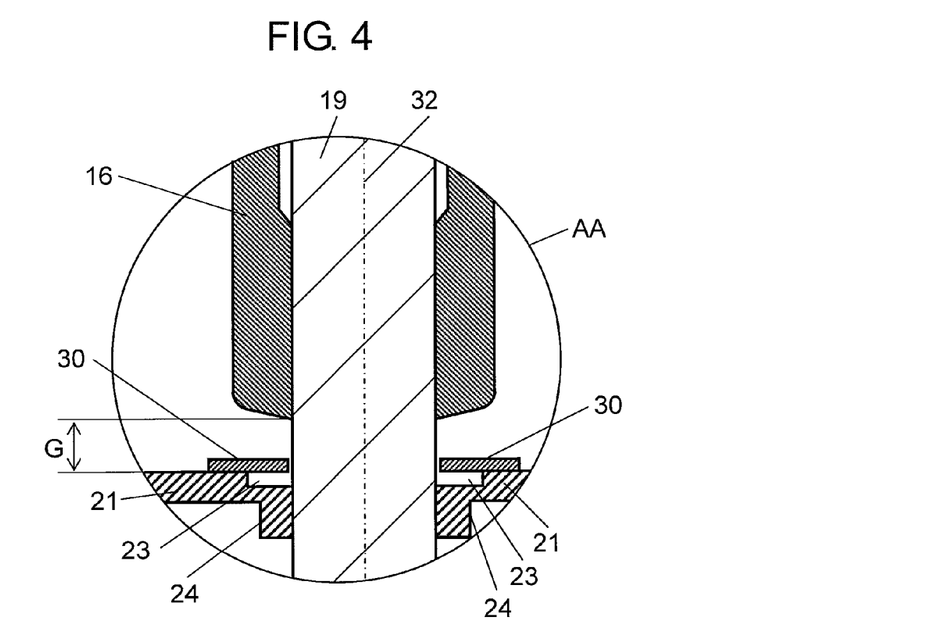
FIG. 4 is an enlarged view of an essential part of the motor shown in FIG. 1.
Figure 5:
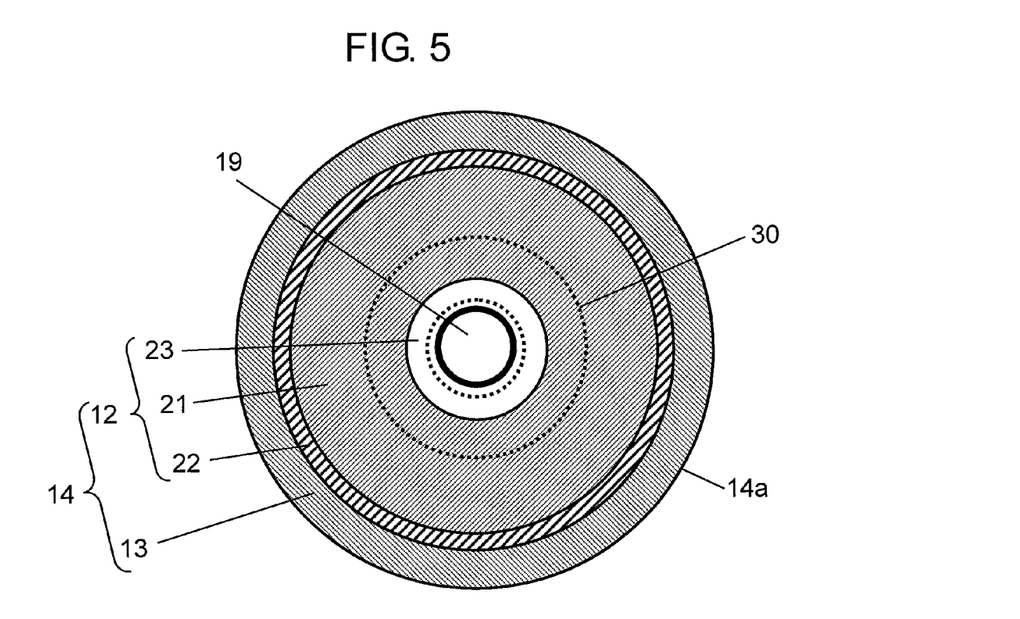
FIG. 5 illustrates a relation between a rotor frame and a washer of the motor shown in FIG. 1.

FIG. 4 is an enlarged view of essential part AA in FIG. 2. FIG. 5 illustrates a positional relation between washer 30 and rotor frame 12 that is viewed from axial direction 32. First, as shown in FIG. 5, rotor frame 12 forms an annular shape when rotor frame 12 is viewed from axial direction 32, and shaft 19 is located at the center of the annular shape. As indicated with a broken line in FIG. 5, washer 30 forms an annular shape. In other words, shaft 19 extends through a center hole of washer 30.

As shown in FIG. 4, space G is provided between disk-like section 21 of rotor frame 12 and bearing 16 along axial direction. Washer 30 is placed in this space G, namely, washer 30 is placed between disk-like section 21 and a rotor-facing end of bearing 16. Washer 30 is placed movably along shaft 19, i.e. not bonded, in space G. Washer 30 is preferably made of resin, e.g. polyethylene terephtalate (PET).

This embodiment employs foregoing washer 30 between rotor frame 12 and bearing 16. If rotor 14 jumps due to a shock as shown in FIG. 3B, this structure allows washer 30 made of resin to exert buffering effect and to lower the collision sound generated between rotor frame 12 and bearing 16.

On top of that, this embodiment employs step section 23 in rotor frame 12. As shown in FIG. 5, step section 23 forms an annular shape viewed from axial direction 32 and the annular shape has a given width from the inner wall of rotor frame 12. Step section 23 is formed in rotor frame 12 such that it goes along the outer wall of shaft 19. As shown in FIG. 4, step section 23 is formed such that it forms a recess at a place where washer 30 confronts rotor frame 12 along axial direction 32. In other words, step section 23 forms a step on a disk-like section 21 at a face confronting bearing 16 in a direction away from bearing 16 and the step forms a recess extending to shaft 19. An outer diameter of step section 23 is smaller than that of washer 30, in other words, washer 30 should not fall in step section 23. End of bearing 16, this end confronting rotor frame 12, has preferably a smaller outer diameter than that of step section 23.

When rotor frame 12 hits bearing 16 via washer 30, step section 23 provided to rotor frame 12 allows its recess to bend an inner side of washer 30. The foregoing actions by step section 23 and washer 30 allow washer 30 to exert a spring effect. As a result, the shock between rotor frame 12 and bearing 16 is buffered, so that the collision sound can be lowered.

Figure 6:
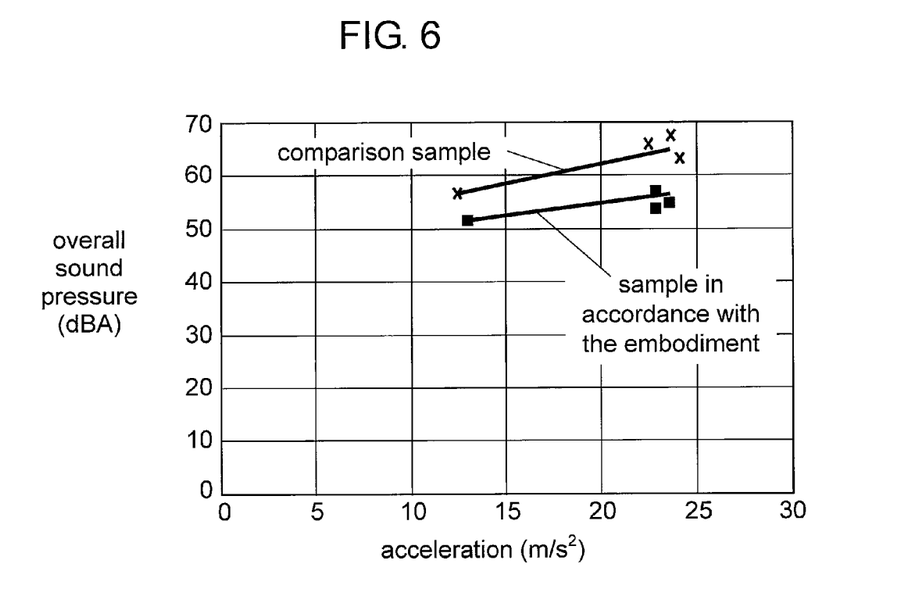
FIG. 6 shows a comparison result between the motor and a comparison example with respect to overall collision sound.
Figure 7:
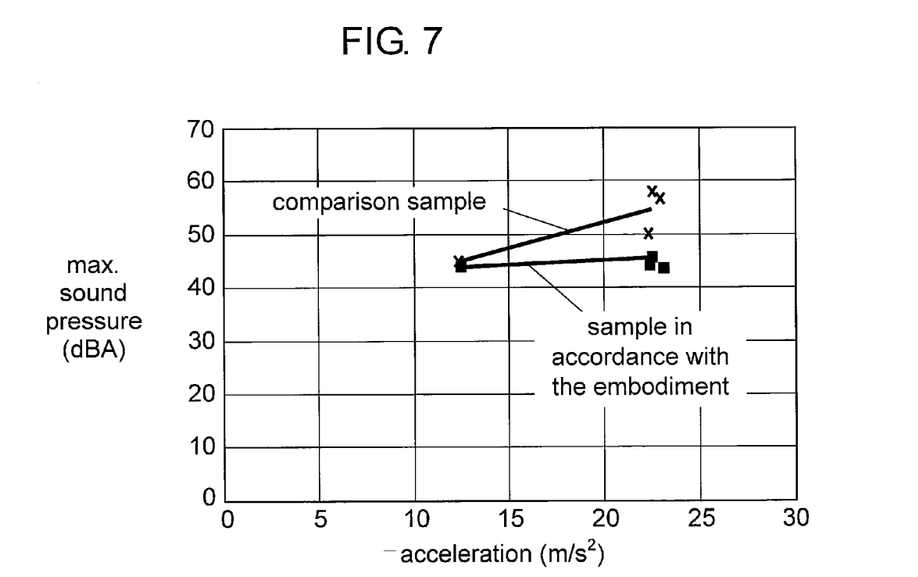
FIG. 7 shows a comparison result between the motor and the comparison example in collision sound at the max. sound pressure.

FIG. 6 shows a comparison result between foregoing motor 10 and a comparison sample in overall collision sound. FIG. 7 shows another comparison result between motor 10 and the comparison sample in collision sound at max. sound pressure.

A motor without step section 23 is used as the comparison sample. Except the no step section, this sample has the same structures as those of motor 10. A shock is applied to the sample motor and motor 10 along axial direction 32, and accelerations at the shock application and sound pressures of the collision sounds generated from the sample motor and motor 10 are measured. The accelerations of approx. 12 m/s$^2$ and approx. 23 m/s$^2$ are measured. FIG. 6 shows an average sound pressure (overall) level within a given frequency range, and FIG. 7 shows a sound pressure level at the frequency that the sound pressure reaches to a peak sound pressure. FIGS. 6 and 7 prove that the presence of step section 23 lowers the collision sound.

Figure 8:
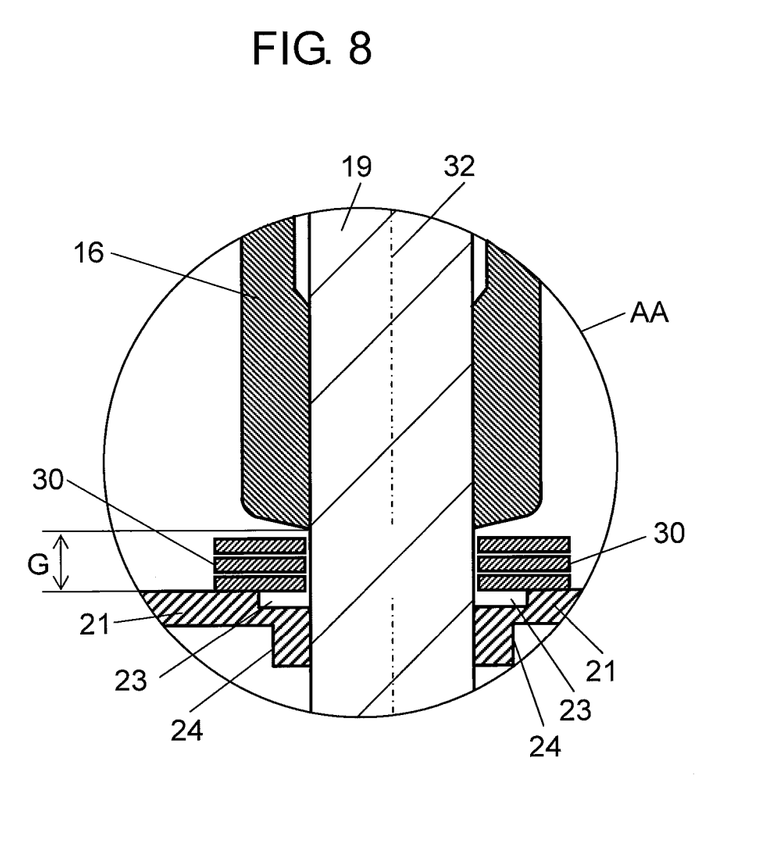
FIG. 8 shows a motor in accordance with another embodiment.

The foregoing description refers to the case where only one washer 30 is disposed; however, multiple washers 30 can be disposed. FIG. 8 shows a structure where multiple washers 30 are disposed, namely, three washers 30 are available. From the perspective of lowering the collision sound, washer 30 made of resin rather than metal produces a greater effect; however, a washer made of resin is generally more fragile than a washer made of metal, so that it is easier to be broken than the washer made of metal. Even if one of washers 30 exceeds its elastic limit and is deformed, remaining washers 30 still can keep the effect of lowering the collision sound.

Figure 9A:
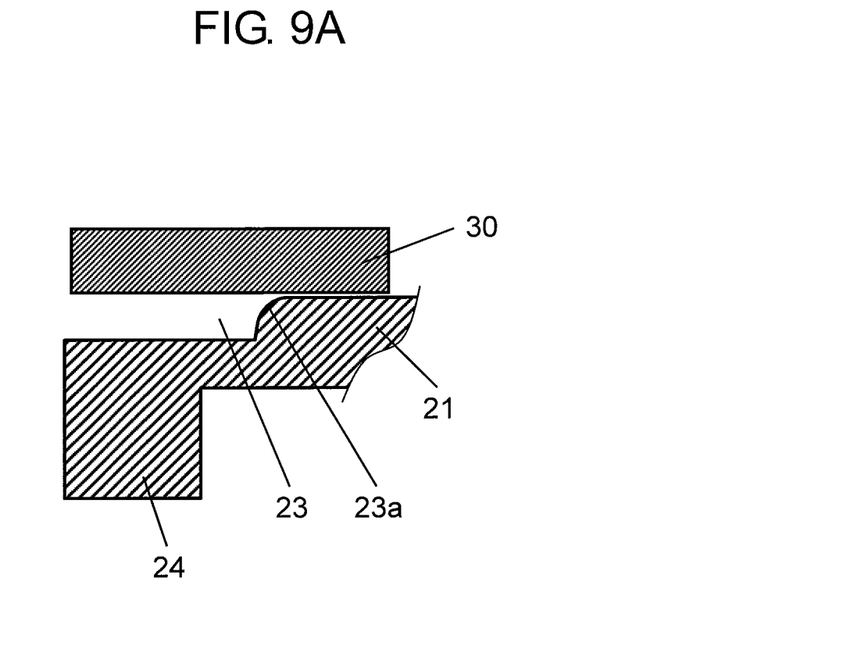
FIG. 9A shows a motor in accordance with still another embodiment.
Figure 9B:
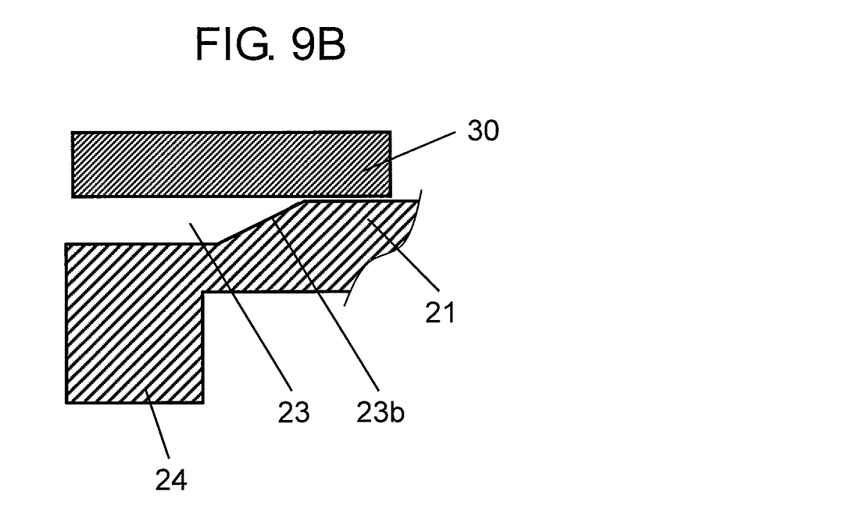
FIG. 9B shows a motor in accordance with yet still another embodiment.

Step section 23 can form a taper or a round shape from inside surface of disk-like section 21. FIG. 9A illustrates that a corner section of the step starting from inner surface of disk-like section 21 is modified to curve section 23a of which cross section shows a curve. FIG. 9B illustrates that slant section 23b is formed starting from the inner surface of disk-like section 21 to the bottom of step section 23, and the cross section of slant section 23b shows a slanted straight line. Presence of curve section 23a or slant section 23b will prevent washer 30 from being broken when rotor frame 12 hits bearing 16.

Figure 9C:
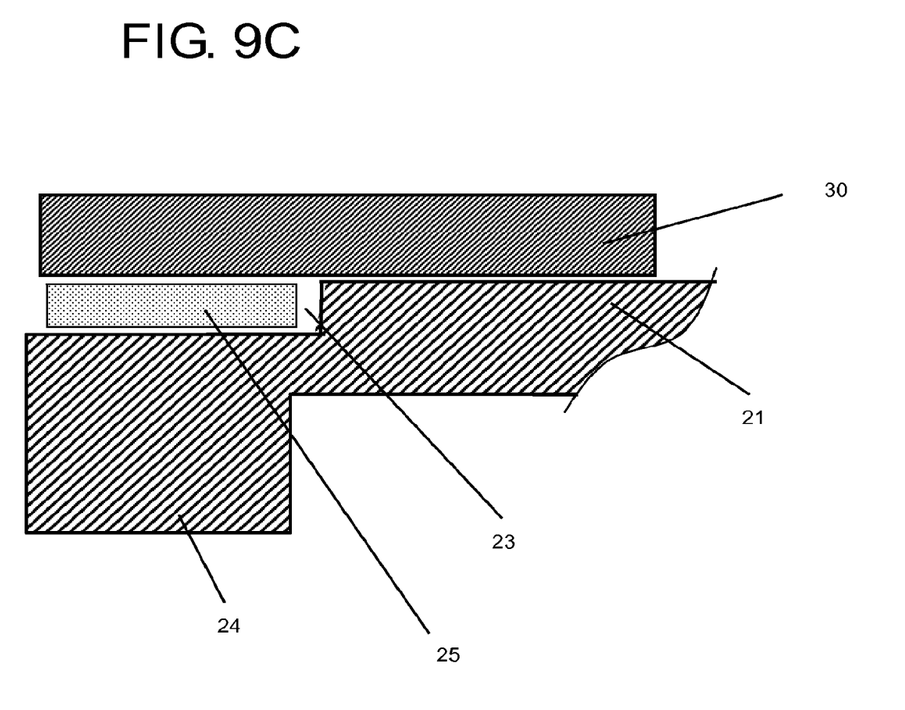
FIG. 9C shows a motor in accordance with yet still another embodiment.

The above discussion refers to step section 23 forming a hollow section (recess); however, as shown in FIG. 9C, an elastic buffer member 25 is placed at the hollow section for protecting washer 30 and also enhancing the buffering effect to the shock.

Embodiment 2

Figure 10:
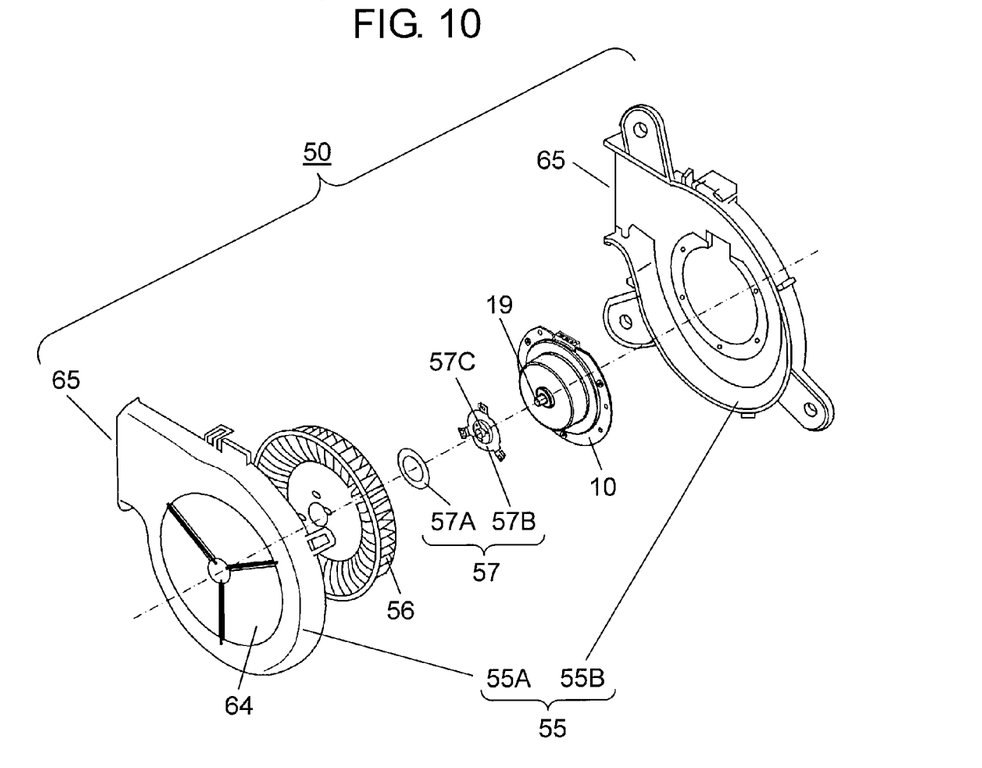
FIG. 10 shows a structure illustrating an outline of a fan motor in accordance with a second embodiment of the present invention.
Figure 11:
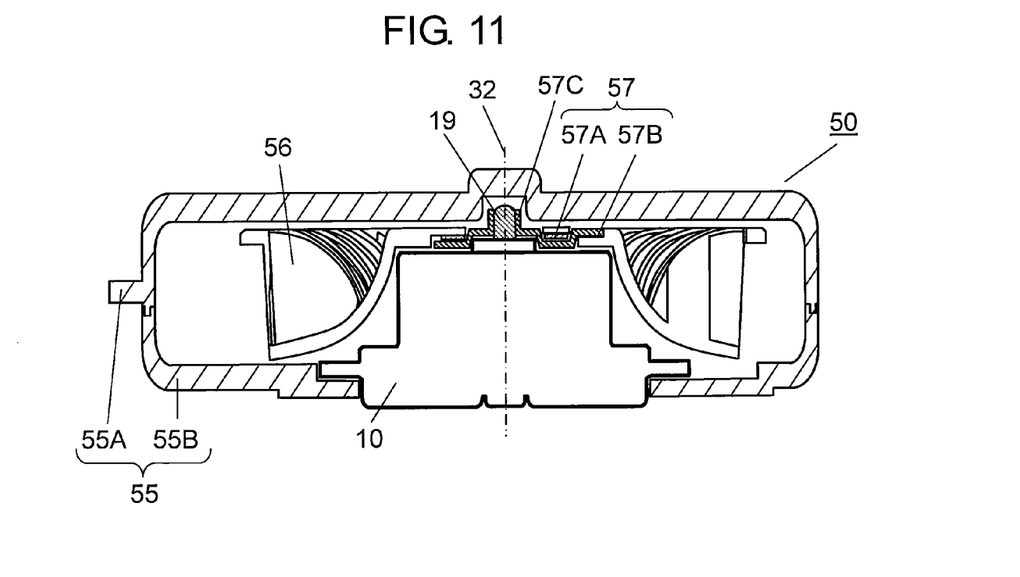
FIG. 11 is a sectional view of an essential part of the fan motor shown in FIG. 10.

FIG. 10 illustrates a structure outlining a fan motor in accordance with the second embodiment of the present invention. FIG. 11 is an enlarged view of an essential part of the fan motor in accordance with the second embodiment. This fan motor is equipped with motor 10 described in the first embodiment, namely, fan motor 50 is equipped with the motor of the present invention.

Fan motor 50 is formed of housing 55 (55A, 55B), which accommodates fan 56, fan fixing section 57, and motor 10. Housing 55 includes sucking port 64 and blow-off port 65. Housing 55 is made of resin, e.g. polyethylene terephtalate (PET), polycarbonate (PC), polypropylene (PP), or mixed material of these resins, or the mixed agent with glass fiber.

Fan 56 employs a sirocco fan. Fan fixing section 57 is formed of elastic plate 57A and fan mounting plate 57B. Plate 57A is made of silicone rubber, which can be replaced with adhesive that can retain a given elastic force after it is hardened. To be more specific, any silicone intimate mixture can produce an advantage similar to what is discussed previously. Instead of silicone rubber, en elastic foamed material can be used. To be more specific, rubber sponge or urethane sponge can produce an advantage similar to what is obtained by foregoing elastic plate 57A. Fan mounting plate 57B is made of metal or resin. An electric galvanizing sheet can be used as the metal material, and PBT, PC, PP or the mixed member of these resins, or the mixed member with glass fiber can be used as the resin material. Shaft 19 of motor 10 is inserted into hole 57C punched in fan mounting plate 57B at the center. Shaft 19 is press-fitted in this hole 57C, thereby mounting rigidly fan mounting plate 57B to shaft 19.

As discussed above, fan motor 50 in accordance with the second embodiment is equipped with the motor of the present invention, thereby achieving a fan motor that can lower a collision sound.

An instance of using the fan motor of the present invention as an on-vehicle fan motor is demonstrated hereinafter with reference to FIGS. 12 and 13.

Figure 12:
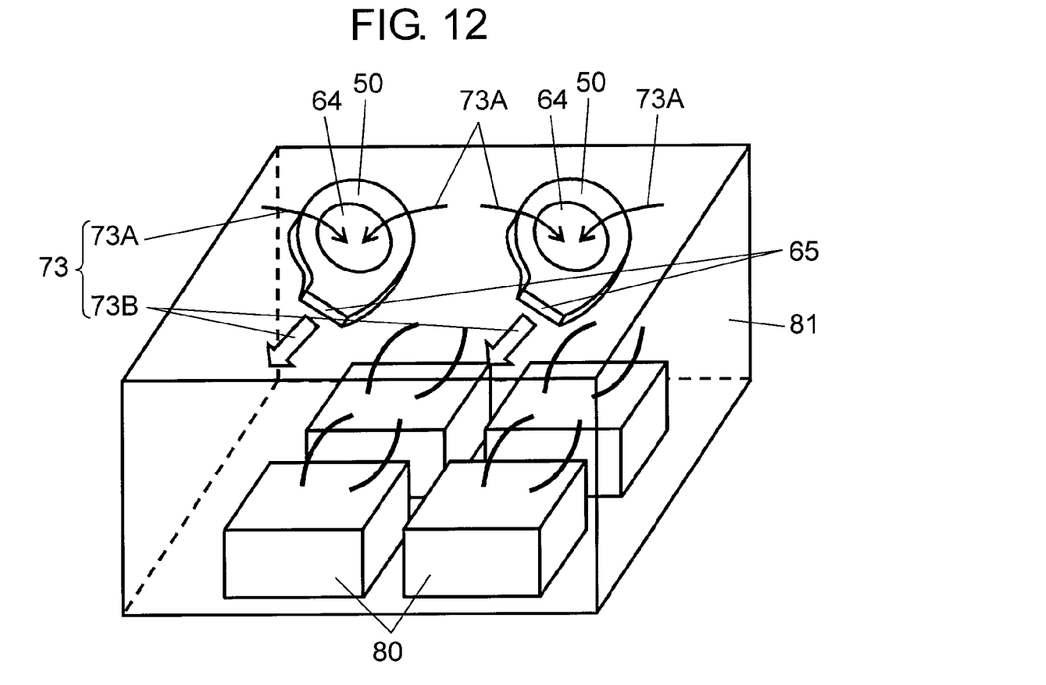
FIG. 12 is a perspective view schematically illustrating the fan motor placed in a container.

FIG. 12 shows a case where fan motor 50 in accordance with the second embodiment is used for cooling on-vehicle battery 80. The airflow in this case is indicated with arrows 73 (73A, 73B) in FIG. 12. Fan motor 50 shown in FIG. 12 employs a sirocco fan. Use of a motor in smaller size allows downsizing this on-vehicle fan motor 50 comparing with a conventional fan motor. As a result, fan motor 50 can be placed with a higher degree of freedom, so that fan motor 50 can be placed at a place suitable for cooling respective on-vehicle batteries 80 although container 81 of batteries 80 has a complicated airflow circuit. As a result, a more efficient airflow circuit can be formed, and energy saving can be progressed.

Figure 13:
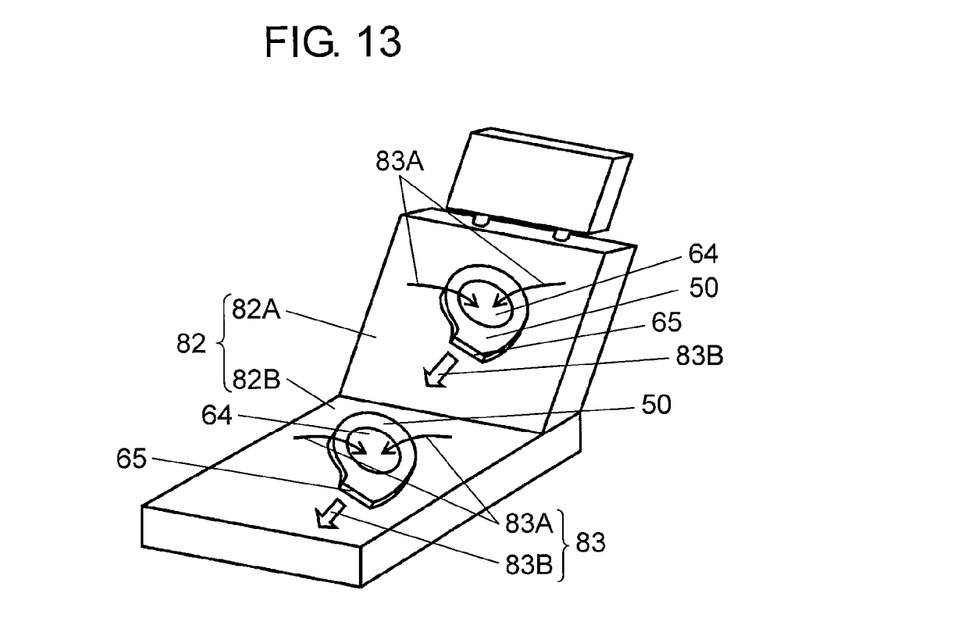
FIG. 13 is a perspective view schematically illustrating the fan motor used in a seat.

As FIG. 13 shows, on-vehicle fan motor 50 is built in seat 82 on which a driver or a person sharing the car sits. To be more specific, fan motor 50 is built in backrest 82A and seating face 82B of seat 82. The airflow in this case is indicated with arrows 83 (83A, 83B) in FIG. 13. Fan motor 50 shown in FIG. 13 also employs a sirocco fan, so that the air sucked (83A) through sucking port 64 is blown (83B) from blow-off port 65 disposed on a face substantially orthogonal to sucking port 64.

In FIG. 13, sucking ports 64 are disposed both on the surface side of backrest 82A and on the top face side of seating face 82B so that airflows 83 can be described simply. However, when comfortableness to a driver or a person sharing the car is taken into consideration, or when simpler air suction to an on-vehicle air conditioner should be taken into account, sucking ports 64 are preferably disposed on the rear side of backrest 82A and on the lower side of seating face 82B.

As discussed above, use of the motor of the present invention in an on-vehicle fan motor will buffer the shock produced by the collision between the bearing and the rotor frame. This collision occurs when the car runs on a bad road or steps, and whereby the force greater than and reversal to the restoring force is applied to the shaft.

As a result, the collision sound generated by the shock caused by the collision between the bearing and the rotor frame can be buffered.

As discussed above, the motor of the present invention comprises a shaft, a bearing for supporting the shaft rotatably, a rotor including a rotor frame mounted to the shaft along an axial direction of the shaft, a stator confronting via a space an outer wall of the rotor, and a washer disposed between the bearing and the rotor frame. A step section forming a recess is provided in the rotor frame at a place confronting the rotor frame. The fan motor of the present invention is equipped with the motor of the present invention. The motor and the fan motor of the present invention have the foregoing structures, and these simple structures can buffer a collision sound caused by a collision between the bearing and the rotor frame.

The foregoing description refers to a brushless motor of inner rotor type; however, the present invention is not limited to this example, for instance, the present invention is applicable to an outer rotor type motor or a motor with brush.

The foregoing description refers to a motor that uses magnetic restoring force; however, the present invention is not limited to the motor using the restoring force, for instance, the present invention is applicable to a motor of which rotor moves along the shaft due to a shock, e.g. a motor using its own weight.

INDUSTRIAL APPLICABILITY

The present invention is suitable for on-vehicle application, and also applicable to devices that are required saving space and buffering a collision sound caused by a shock.

The invention claimed is:

1. A motor comprising:
    a shaft;
    a bearing for supporting the shaft rotatably;
    a rotor including a rotor frame to be mounted to the shaft along an axial direction of the shaft;
    a stator confronting an outer wall of the rotor via a space; and
    a washer movably disposed in a predetermined space formed between the bearing and the rotor frame in the axial direction of the shaft,
    wherein a step section forming a recess is provided in the rotor frame at a place where the washer is arranged to abut or be adjacent to the rotor frame and an outer diameter of the step section is smaller than that of the washer.

2. The motor of claim 1, wherein the rotor and the stator are disposed such that a magnetic center of the rotor is away from a magnetic center of the stator by a given distance for magnetic restoring force to work between the rotor and the stator.

3. The motor of claim 1, wherein the washer comprises a plurality of washers which is disposed between the bearing and the rotor frame.

4. The motor of claim 1, wherein the step section is formed in the rotor frame around an outer wall of the shaft.

5. The motor of claim 1, wherein a buffering member is disposed in the step section.

6. A fan motor, comprising:
    a fan;
    a fan fixing section for mounting and supporting the fan;
    the motor as defined in claim 1; and
    a housing for accommodating the fan, the fan fixing section and the motor, the housing including a sucking port and a blow-off port.

* * * * *